(12) United States Patent
Nishimura

(10) Patent No.: US 8,919,107 B2
(45) Date of Patent: Dec. 30, 2014

(54) CONTROL DEVICE OF DIESEL ENGINE WITH TURBOCHARGER

(71) Applicant: Mazda Motor Corporation, Aki-gun, Hiroshima (JP)

(72) Inventor: Hiroyuki Nishimura, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 82 days.

(21) Appl. No.: 13/691,456

(22) Filed: Nov. 30, 2012

(65) Prior Publication Data

US 2013/0167509 A1 Jul. 4, 2013

(30) Foreign Application Priority Data

Dec. 28, 2011 (JP) ................................. 2011-288582

(51) Int. Cl.
| | |
|---|---|
| *F01N 3/00* | (2006.01) |
| *F01N 3/02* | (2006.01) |
| *F02M 25/06* | (2006.01) |
| *F01N 5/04* | (2006.01) |
| *F01N 9/00* | (2006.01) |
| *F02M 25/07* | (2006.01) |
| *F02D 41/02* | (2006.01) |
| *F02D 41/00* | (2006.01) |
| *F02D 41/12* | (2006.01) |
| F02B 37/00 | (2006.01) |
| F02B 37/013 | (2006.01) |
| F02B 37/18 | (2006.01) |

(52) U.S. Cl.
CPC .............. *F01N 9/002* (2013.01); *F02M 25/07* (2013.01); *F02D 41/029* (2013.01); *F02D 41/0007* (2013.01); *F02D 41/123* (2013.01); *F02D 41/0055* (2013.01); F02B 37/004 (2013.01); F02B 37/013 (2013.01); F02B 37/18 (2013.01); Y02T 10/144 (2013.01); Y02T 10/47 (2013.01)

USPC .................. 60/295; 60/274; 60/278; 60/280; 60/285; 60/287; 60/297; 60/311

(58) Field of Classification Search
CPC ...... F01N 9/002; F02B 37/004; F02B 37/013; F02B 37/18; F02D 41/0007; F02D 41/0055; F02D 41/029; F02D 41/123; F02M 25/07
USPC ........... 60/274, 278, 280, 285, 287, 295, 297, 60/311
See application file for complete search history.

(56) References Cited

U.S. PATENT DOCUMENTS 7,980,060 B2 * 7/2011 Tachimoto et al. ............. 60/277

FOREIGN PATENT DOCUMENTS

| JP | 2004316441 | 11/2004 |
|---|---|---|
| JP | 2009191737 | 8/2009 |

*Primary Examiner* — Thomas Denion
*Assistant Examiner* — Diem Tran
(74) *Attorney, Agent, or Firm* — Alleman Hall McCoy Russell & Tuttle LLP

(57) ABSTRACT

A control device of a diesel engine with a turbocharger is provided. The device includes an engine body having a cylinder, a fuel injection valve, a turbine of the turbocharger, a bypass passage for bypassing the turbine, a bypass valve for opening and closing the bypass passage, an oxidation catalyst for purifying HC, and a DPF for capturing soot. The device includes a fuel cutting module for stopping, when the diesel engine is in a deceleration state, a main injection of the fuel performed on compression stroke, a DPF regenerating module for performing, when a predetermined DPF regeneration condition is satisfied, a post injection on expansion stroke to supply HC to the oxidation catalyst and regenerate the DPF by heat generated from an oxidation reaction of HC, and a bypass valve control module for controlling the bypass valve.

8 Claims, 5 Drawing Sheets

CONTROL DEVICE OF DIESEL ENGINE WITH TURBOCHARGER

BACKGROUND

The present invention relates to a control device of a diesel engine with a turbocharger.

Conventionally, diesel engines provided with diesel particulate filters (hereinafter, also referred to as "DPF") in their exhaust passages have been well known. The DPF captures particulate matters (PM) within exhaust gas, and when an accumulation amount of the PM increases, it needs to be regenerated. Normally, on the upstream side of such DPF, a catalyst having an oxidizing function (e.g., oxidation catalyst) is provided and the catalyst is used in the DPF regeneration. For example, JP2004-0316441A discloses a diesel engine that performs a main injection in which fuel for generating a torque is injected into a cylinder, and then a post injection to introduce uncombusted fuel to an exhaust passage. When the uncombusted fuel reaches the catalyst, it is oxidized and increases an exhaust gas temperature. As a result, the PM accumulated in the DPF is combusted to be removed by a high temperature exhaust gas. Thus, the DPF is regenerated.

Moreover, this kind of diesel engine may be provided with a turbocharger to collect an energy of exhaust gas and increase a turbocharging pressure. For example, JP2009-0191737A discloses a diesel engine that includes two large and small turbochargers. The turbine of the small turbocharger is arranged upstream of the turbine of the large turbocharger in the exhaust flow. Moreover, in an exhaust passage of this diesel engine, an upstream bypass passage for bypassing the upstream turbine and a downstream bypass passage for bypassing the downstream turbine are placed, a regulator valve is provided within the upstream bypass passage, and a waste gate valve is provided within the downstream bypass passage.

Meanwhile, in the engine with the turbocharger disclosed in JP2009-0191737A, when the engine shifts to a deceleration state (low-speed-and-load operation state), it is preferred that the regulator valve is controlled to have a smaller opening and the small turbocharger with comparatively less rotary inertia is operated. Thereby, an acceleration response can be improved when reaccelerating the engine.

However, in this case, the exhaust gas discharged from the cylinder of the engine is supplied to an oxidation catalyst after passing the turbine of the small turbocharger, and thus, the heat of the exhaust gas is taken by the turbine and the exhaust gas temperature to be supplied to the oxidation catalyst decreases.

Especially, when the engine is in a deceleration state, a fuel injection to a cylinder on compression stroke (main injection) is prohibited (because a fuel cut is performed), and therefore, the temperature of the exhaust gas to be supplied to the oxidation catalyst significantly decreases, causing a difficulty in maintaining the oxidation catalyst in an activated state. Therefore, even if the post injection is performed to regenerate the DPF, the injected combusted fuel will not be oxidized, and thus, an exhaust gas temperature increasing effect using heat from the oxidation reaction is lost and it takes time to regenerate the DPF, causing degradation in fuel consumption and problems that a larger amount of fuel attaches on an in-cylinder wall face because the post injection and engine oil is diluted.

SUMMARY

The present invention is made in view of the above situations and provides a control device of the diesel engine that is shortened in a period of time of regenerating a DPF of a diesel engine while decelerating, and further suppressed in dilution of the engine oil and degradation of a fuel consumption of the engine when the DPF regeneration is performed by the post injection, by devising a configuration of the control device.

According to one aspect of the invention, a control device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, and a DPF arranged within the exhaust passage downstream of the oxidation catalyst and for capturing soot contained within the exhaust gas is provided. The device includes a fuel cutting module for stopping, when the diesel engine is in a deceleration state, a main injection of the fuel that is performed on compression stroke of the cylinder, a DPF regenerating module for performing, when a predetermined DPF regeneration condition is satisfied, a post injection on expansion stroke of the cylinder to supply HC to the oxidation catalyst and regenerate the DPF by heat generated from an oxidation reaction of HC, and a bypass valve control module for controlling the bypass valve. When the diesel engine is in the deceleration state and the predetermined DPF regeneration condition is satisfied, the bypass valve control module controls the bypass valve to open to an extent more than an opening of the bypass valve when the predetermined DPF regeneration condition is not satisfied.

When the predetermined DPF regeneration condition is satisfied, the post injection of the fuel is performed by the DPF regenerating module. The post injected uncombusted fuel (HC) is supplied to the oxidation catalyst along with the exhaust gas, causes an oxidation reaction, increases the temperature of the exhaust gas by the heat generated from the oxidation reaction, and thus, exhaust particulates accumulated in the DPF are combusted by the exhaust gas at the increased temperature and removed therefrom. Thus, the DPF regeneration is performed by the DPF regenerating module.

Further, if the engine is in the deceleration state when the DPF regeneration condition is satisfied (during the DPF regeneration), the bypass valve is controlled to open more by the bypass valve control module as compared to when the DPF regeneration condition is not satisfied. As a result, a flow ratio of the exhaust gas that bypasses the turbine of the turbocharger increases. Therefore, it can be prevented that the heat of the exhaust gas to be supplied to the DPF is taken away by the turbine and the temperature of the exhaust gas decreases. Therefore, when the engine is in the deceleration state, even if the in-cylinder temperature is decreased due to the fuel cut by the fuel cutting module (stop of the main injection), the temperature of the exhaust gas to by supplied to the oxidation catalyst is kept high, and the DPF can be maintained in the activated state (the state where the temperature of the DPF is above an activating temperature) as long as possible. As a result, the exhaust gas to be supplied to the DPF is sufficiently increased and the DPF regenerating time period can be shortened. Therefore, the dilution of the engine oil and the decrease of the fuel consumption of the engine due to the post injection (DPF regeneration) can be suppressed.

The device may further include an EGR passage communicating an intake passage for introducing intake air into the cylinder with a part of the exhaust passage upstream of the turbine, an EGR valve for opening and closing the EGR passage, and an EGR valve control module for controlling the EGR valve. While the DPF is regenerated by the DPF regenerating module, the EGR valve control module may control the EGR valve to be fully closed.

The EGR valve is controlled to be fully closed by the EGR valve control module while regenerating the DPF. In this manner, a part of post injected uncombusted fuel (HC element) being recirculated back into the cylinder and being incompletely combusted can be prevented. Thus, a degradation of the engine brake performance in the engine deceleration does not occur.

The turbocharger may be a two-stage turbocharger of which the turbines are arranged in line within the exhaust passage from its upstream to downstream. The bypass passage may include an upstream bypass passage for bypassing one of the turbines positioned upstream of the other turbine, the turbines being provided within the exhaust passage, and a downstream bypass passage for bypassing the downstream turbine. The bypass valve may include an upstream bypass valve for opening and closing the upstream bypass passage, and a downstream bypass valve for opening and closing the downstream bypass passage. The oxidation catalyst may be arranged within the exhaust passage downstream of the downstream bypass passage. When the diesel engine is in the deceleration state and the DPF regeneration condition is satisfied, the bypass valve control module may control the upstream and downstream bypass valves to open to the extent more than the openings when the DPF regeneration condition is not satisfied, respectively.

When the engine is in the deceleration state and the DPF regeneration condition is satisfied in the diesel engine with the two turbochargers, the upstream and downstream bypass valves are controlled by the bypass valve control module to open to the extent more than the opening of the bypass valve when the DPF regeneration condition is not satisfied. As a result, the exhaust gas discharged from the cylinder bypasses the upstream and downstream turbines and supplied to the oxidation catalyst. Therefore, it can be prevented that the heat of the exhaust gas exhausted from the cylinder is taken away by the turbine and the temperature of the exhaust gas decreases, and as a result, the temperature decrease of the exhaust gas to be supplied to the oxidation catalyst can be suppressed. Thus, the operations and effects similar to the above aspect can easily be obtained.

When the engine is in the deceleration state, after the DPF regeneration by the DPF regenerating module ends, the bypass valve control module may control the bypass valve to throttle to the extent smaller than the opening of the bypass valve during the DPF regeneration.

When the engine is in the deceleration state, after the DPF regeneration by the DPF regenerating module ends, the bypass valve is controlled to throttle to the extent smaller than the opening of the bypass valve during the DPF regeneration. Therefore, when the engine accelerates from the deceleration state, the turbocharger (turbine) is promptly activated to stimulate the increase of a turbocharging pressure, and an acceleration response can be improved.

DETAILED DESCRIPTION OF EMBODIMENTS

Hereinafter, one embodiment of the present invention is described in detail with reference to the appended drawings.

Figure 1:
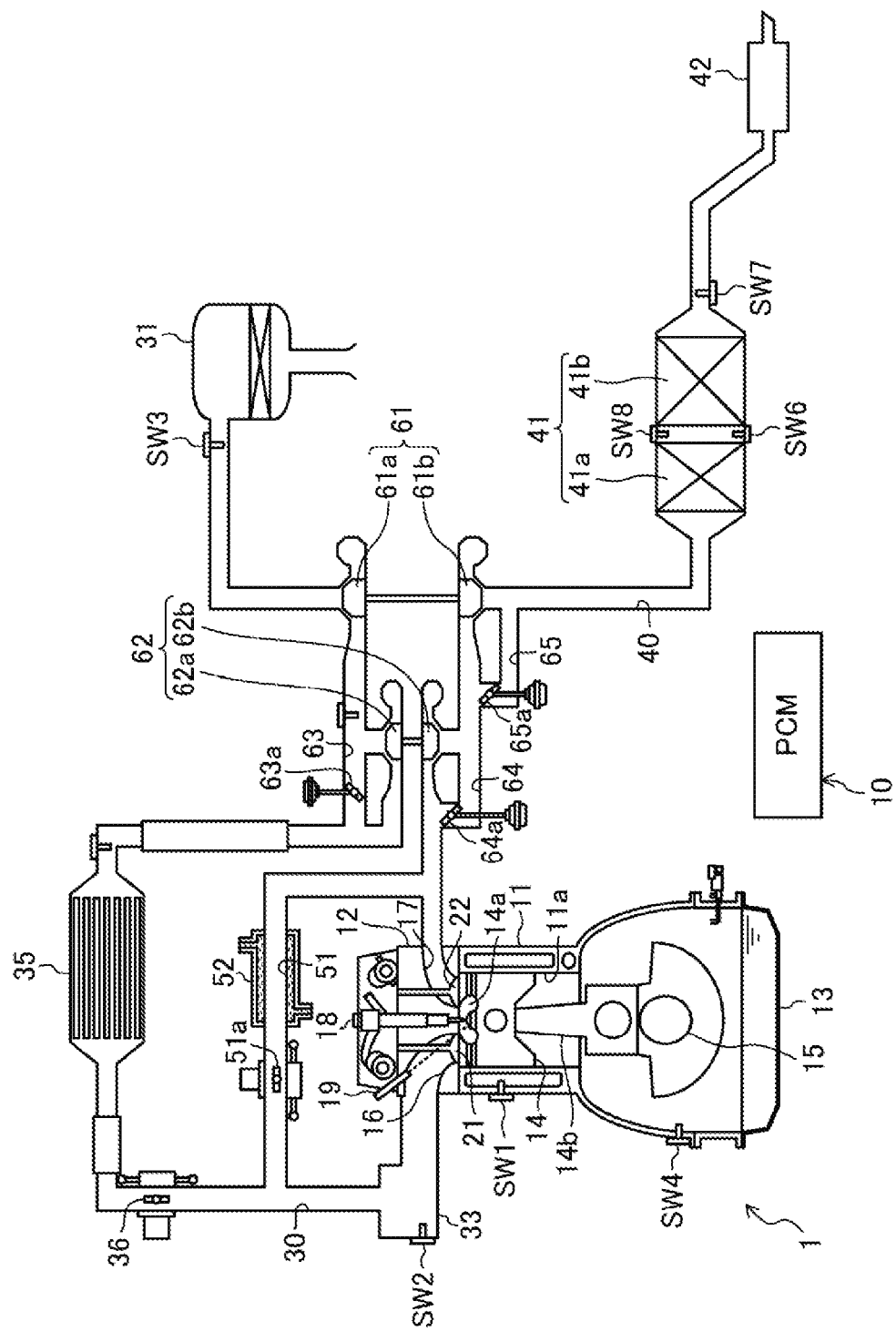
FIG. 1 is a schematic diagram illustrating a diesel engine provided with a control device according to one embodiment of the invention.

FIG. 1 is a schematic configuration of an engine 1 (engine body) according to the embodiment. The engine 1 is a diesel engine installed in a vehicle and to which fuel containing diesel fuel as its main component. The engine 1 includes a cylinder block 11 formed with a plurality of cylinders 11a (only one cylinder is illustrated), a cylinder head 12 arranged on the cylinder block 11, and an oil pan 13 arranged below the cylinder block 11 and where a lubricant is stored. Inside each cylinder 11a of the engine 1, a piston 14 is reciprocatably fitted, and a cavity partitioning a reentrant-shaped combustion chamber 14a is formed on a top face of the piston 14. The piston 14 is coupled to a crank shaft 15 via a connecting rod 14b.

The cylinder head 12 is provided with the injectors 18 for injecting the fuel and glow plugs 19 for improving ignitability of the fuel by warming up intake air in a cold state of the engine. Each injector 18 is arranged so that its fuel injection port is exposed within the combustion chamber 14a from a ceiling surface of the combustion chamber 14a, and it directly supplies the fuel to the combustion chamber 14a by injection basically when the piston is near a top dead center (TDC) on compression stroke. The injector 18 constitutes a fuel injection valve.

An intake passage 30 is connected on one side face of the engine 1 so as to communicate with the intake ports 16 of the cylinders 11a. On the other hand, an exhaust passage 40 through which combusted gas (exhaust gas) from each cylinder 11a is discharged is connected with on the other side face of the engine. The intake and exhaust passages 30 and 40 are arranged with a large turbocharger 61 and a small turbocharger 62 for turbocharging the intake air (described later in details).

An air cleaner 31 for filtering intake air is arranged in an upstream end part of the intake passage 30. A surge tank 33 is arranged near a downstream end of the intake passage 30. A part of the intake passage 30 downstream of the surge tank 33 is branched toward the respective cylinders 11a to be independent passages, and downstream ends of the independent passages are connected with the intake ports 16 of the cylinders 11a, respectively.

Compressors 61a and 62a of the large and small turbochargers 61 and 62, a compressor 62a of the small turbocharger 62, an intercooler 35 for cooling air compressed by the compressors 61a and 62a, and a throttle valve 36 for adjusting an intake air amount for each combustion chamber 14a of the cylinder 11a are arranged between the air cleaner 31 and the surge tank 33 in the intake passage 30. The throttle valve 36 is basically fully opened; however, it is fully closed when the engine 1 is stopped to avoid a shock.

An upstream part of the exhaust passage 40 is constituted with an exhaust manifold having independent passages branched toward the cylinders 11a respectively, and connected with outer ends of the exhaust ports 17, and a merging section where the independent passages merge together.

In a part of the exhaust passage 40 downstream of the exhaust manifold, a turbine 62b of the small turbocharger 62, a turbine 61b of the large turbocharger 61, an exhaust emission control system 41 for purifying hazardous components contained in the exhaust gas, and a silencer 42 are arranged from its upstream side in this order.

The exhaust emission control system 41 includes the oxidation catalyst 41a and a DPF 41b arranged from its upstream side in this order. The oxidation catalyst 41a and the DPF 41b are accommodated in a single case. The oxidation catalyst 41a has an oxidation catalyst carrying, for example, only platinum or platinum added with palladium, and promotes a reaction of oxidizing CO and HC contained within the exhaust gas to generate $CO_2$ and $H_2O$. The oxidation catalyst 41a configures a catalyst having an oxidation function. Further, the DPF 41b is a filter that captures PM, such as soot, which are contained in the exhaust gas of the engine 1, for example, the DPF 41b is a wall flow type filter formed with heat resistant ceramic material such as silicon carbide (SiC) or cordierite, or a three-dimensional net filter formed with a heat resistant ceramic fiber. Note that, the oxidation catalyst may be coated on the DPF 41b.

An EGR passage 51 for re-circulating a part of the exhaust gas to the intake passage 30 connects a part of the intake passage 30 between the surge tank 33 and the throttle valve 36 (i.e., the part of the intake passage 30 downstream of the small compressor 62a of the small turbocharger 62) with a part of the exhaust passage 40 between the exhaust manifold and the small turbine 62b of the small turbocharger 62 (i.e., the part of the exhaust passage 40 upstream of the small compressor 62a of the small turbocharger 62). The EGR passage 51 is arranged with an EGR valve 51a for adjusting a re-circulating amount of the exhaust gas to the intake passage 30 and an EGR cooler 52 for cooling the exhaust gas by the engine coolant.

The large turbocharger 61 has the large compressor 61a arranged in the intake passage 30 and the large turbine 61b arranged in the exhaust passage 40. The large compressor 61a is arranged in the intake passage 30 between the air cleaner 31 and the intercooler 35. On the other hand, the large turbine 61b is arranged in the exhaust passage 40 between the exhaust manifold and the oxidation catalyst 41a.

The small turbocharger 62 has the small compressor 62a arranged in the intake passage 30 and the small turbine 62b arranged in the exhaust passage 40. The small compressor 62a is arranged in the intake passage 30 downstream of the large compressor 61a. On the other hand, the small turbine 62b is arranged in the exhaust passage 40 upstream of the large turbine 61b.

Thus, the large compressor 61a and the small compressor 62a are aligned in the intake passage 30 in this order from the upstream side, and the small turbine 62b and the large turbine 61b are aligned in the exhaust passage 40 in this order from the upstream side. These large and small turbines 61b and 62b are rotated by an exhaust gas flow, and the large and small compressors 61a and 62a respectively coupled to the large and small turbines 61b and 62b are operated by the rotations of these large and small turbines 61b and 62b.

The small turbocharger 62 is relatively small, and the large turbocharger 61 is relatively large. Thus, the large turbine 61b of the large turbocharger 61 has a larger inertia than the small turbine 62b of the small turbocharger 62.

Further, a small intake bypass passage 63 for bypassing the small compressor 62a is connected with the intake passage 30. This small intake bypass passage 63 is arranged with a small intake bypass valve 63a for adjusting an air amount that flows into the small intake bypass passage 63. The small intake bypass valve 63a is configured to be fully closed (normally closed) when there is no power distribution.

On the other hand, the exhaust passage 40 is connected with a small exhaust bypass passage 64 for bypassing the small turbine 62b and with a large exhaust bypass passage 65 for bypassing the large turbine 61b. The small exhaust bypass passage 64 is arranged with a regulator valve 64a for adjusting an amount of the exhaust gas that flows into the small exhaust bypass passage 64, and the large exhaust bypass passage 65 is arranged with a waste gate valve 65a for adjusting an amount of the exhaust gas that flows into the large exhaust bypass passage 65. The regulator valve 64a and the waste gate valve 65a are both configured to be fully opened (normally opened) when there is no power distribution.

Figure 2:
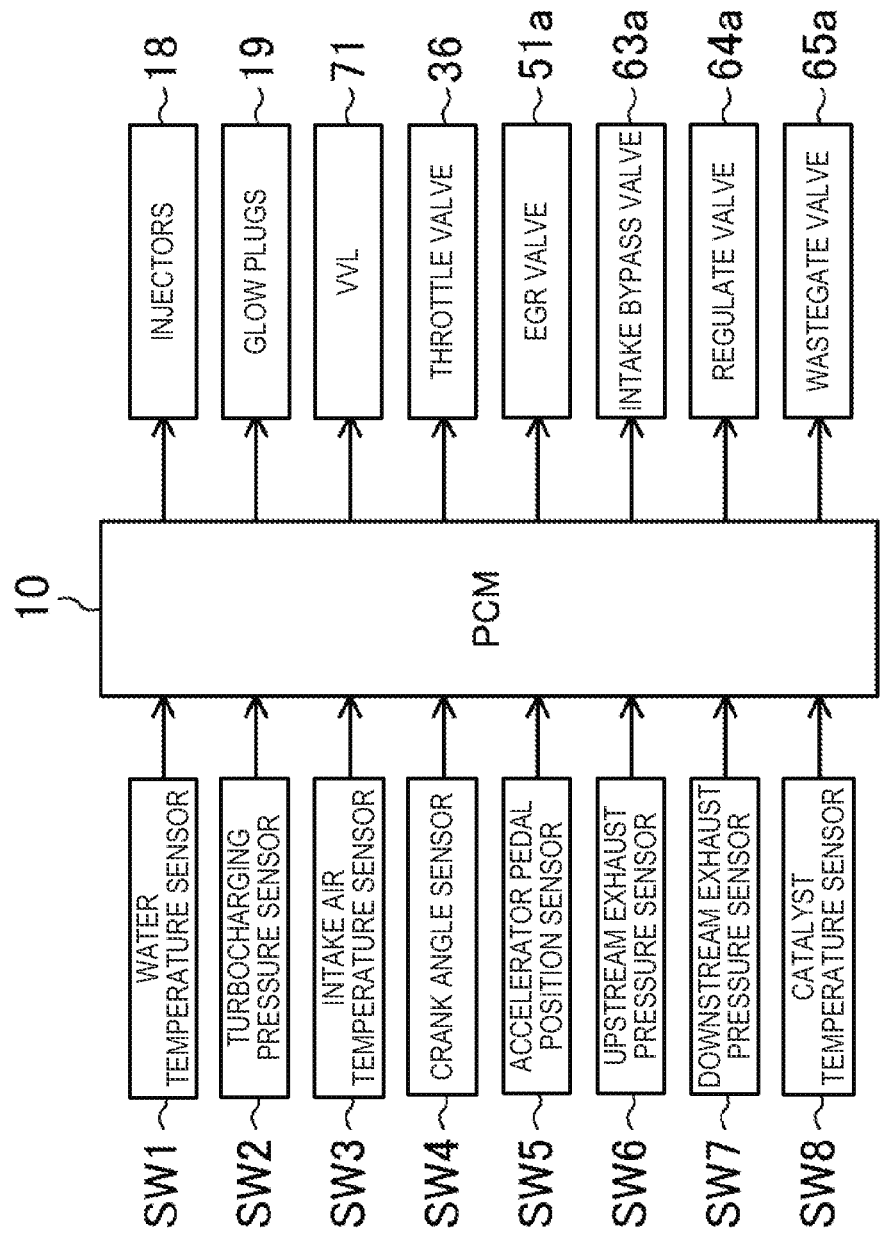
FIG. 2 is a block diagram relating a control of the diesel engine.

The diesel engine 1 configured as above is controlled by a power train control module (hereinafter, referred to as the PCM) 10. The PCM 10 is constituted by a microprocessor having a CPU, a memory, a set of counter timers, an interface, and a communications bus for connecting these units. As illustrated in FIG. 2, the PCM 10 is inputted with detection signals of the water temperature sensor SW1 for detecting the temperature of the engine coolant, a turbocharging pressure sensor SW2 attached to the surge tank 33 and for detecting a pressure of air to be supplied into the combustion chambers 14a, an intake air temperature sensor SW3 for detecting the temperature of intake air, a crank angle sensor SW4 for detecting a rotational angle of the crankshaft 15, an accelerator position sensor SW5 for detecting an accelerator opening corresponding to an angle of an acceleration pedal (not illustrated) of the vehicle, an upstream exhaust pressure sensor SW6 for detecting an exhaust gas pressure on the upstream of the DPF 41b, a downstream exhaust pressure sensor SW7 for detecting the exhaust gas pressure on the downstream of the DPF 41b, and a catalyst temperature sensor SW8 for detecting the temperature of the oxidation catalyst 41a. By performing various kinds of operations based on these detection signals, the PCM 10 determines states of the engine 1 and the vehicle, and further outputs control signals to the injectors 18, the glow plugs 19, the VVL 71 in the valve train system, and operation actuators of the various kinds of valves 36, 51a, 63a, 64a, and 65a according to the determined states.

The engine 1 is configured to have a comparatively low geometric compression ratio of between 12:1 and 15:1 so as to improve an exhaust emission performance and a thermal efficiency. On the other hand, with the engine 1, the large and small turbochargers 61 and 62 increase the torque, and thereby, the reduced torque due to the lowered geometric compression ratio is compensated.

(Outline of Engine Control)

As a basic control of the engine 1, the PCM 10 determines a target torque (targeted load) based mainly on an engine speed and the accelerator opening, and performs a fuel injection by the injector 18 when the piston is near the compression TDC so as to generate the target torque. Note that, when the engine 1 is in deceleration, the PCM 10 performs a fuel cutting control to stop (prohibit) the main injection when the piston is near the compression TDC.

Moreover, when a DPF regeneration condition is satisfied, the PCM 10 performs a post injection that does not contribute to the combustion (does not generate torque) caused by the injector 18 when the cylinder 11a is on the expansion stroke. The post injected fuel is supplied to the oxidation catalyst 41a along with the exhaust gas to be oxidized. The heat generated by this oxidation increases the temperature of the exhaust gas supplied to the DPF 41b, and PM accumulated in the DPF 41b is removed by being combusted using the heat of the exhaust gas (the DPF 41b is regenerated).

Here, the DPF regeneration condition is a predetermined condition with which it is determined that the DPF 41*b* requires to be regenerated. In this embodiment, an accumulation amount of PM in the DPF 41*b* is evaluated (estimated) by a difference ΔP in exhaust gas pressure on the upstream side and the downstream side in the DPF 41*b*, and when the difference pressure ΔP is above a predetermined value X, the DPF regeneration condition is determined to be satisfied. The DPF regeneration ends when the difference pressure ΔP falls below a predetermined minimum value Y smaller than the predetermined value X. Thus, when the PM accumulation amount M in the DPF 41*b* is above the predetermined value X and the DPF regeneration control is started, even if the PM accumulation amount becomes below the predetermined value X thereafter, as long as it does not become below the minimum value Y, the DPF regeneration condition is considered as being satisfied and, thus, the control continues.

The DPF regeneration control by the PCM 10 includes a normal regeneration control performed when the engine 1 is in an acceleration state or a constant speed state and a regeneration-in-deceleration control performed when the engine 1 is in a deceleration state. Thus, the PCM 10 performs the regeneration-in-deceleration control when a filter regeneration condition is determined to be satisfied while the engine 1 is in the deceleration state, and on the other hand, it performs the normal regeneration control when the filter regeneration condition is determined to be satisfied while the engine 1 is in the acceleration state or the constant speed state.

In the normal regeneration control, a timing of the post injection is set to be between 80° to 120° ATDC, and the post injection is referred to as a normal post injection in the following description. On the other hand, in the regeneration-in-deceleration control, the timing of the post injection is set between 30° to 40° ATDC that is advanced compared to the timing of the normal post injection. In the following description, the post injection is referred to as the decelerating post injection.

Figure 3:
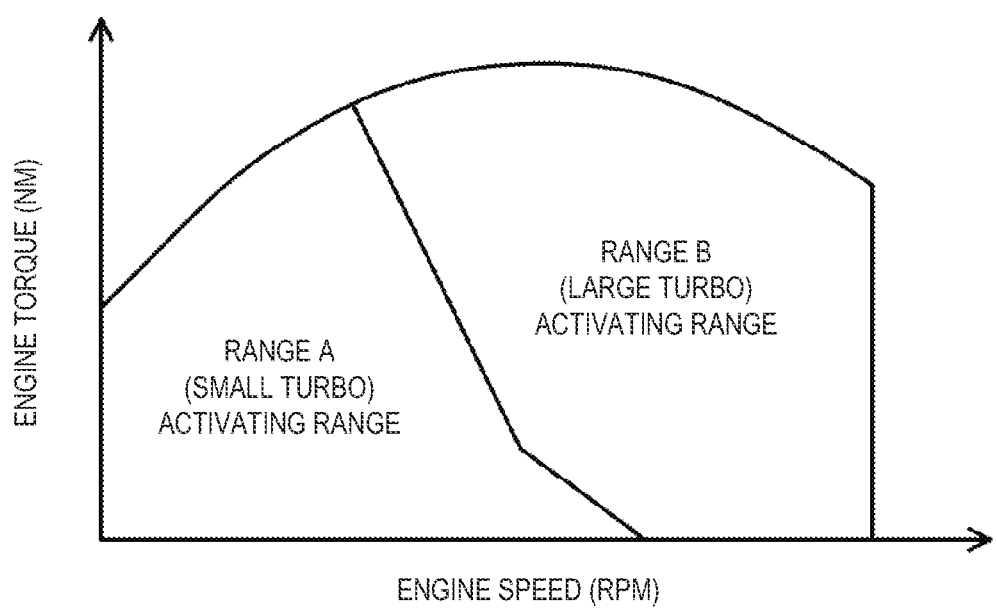
FIG. 3 is a map illustrating operation ranges of large and small turbochargers according to an operation state of the engine.
Figure 4:
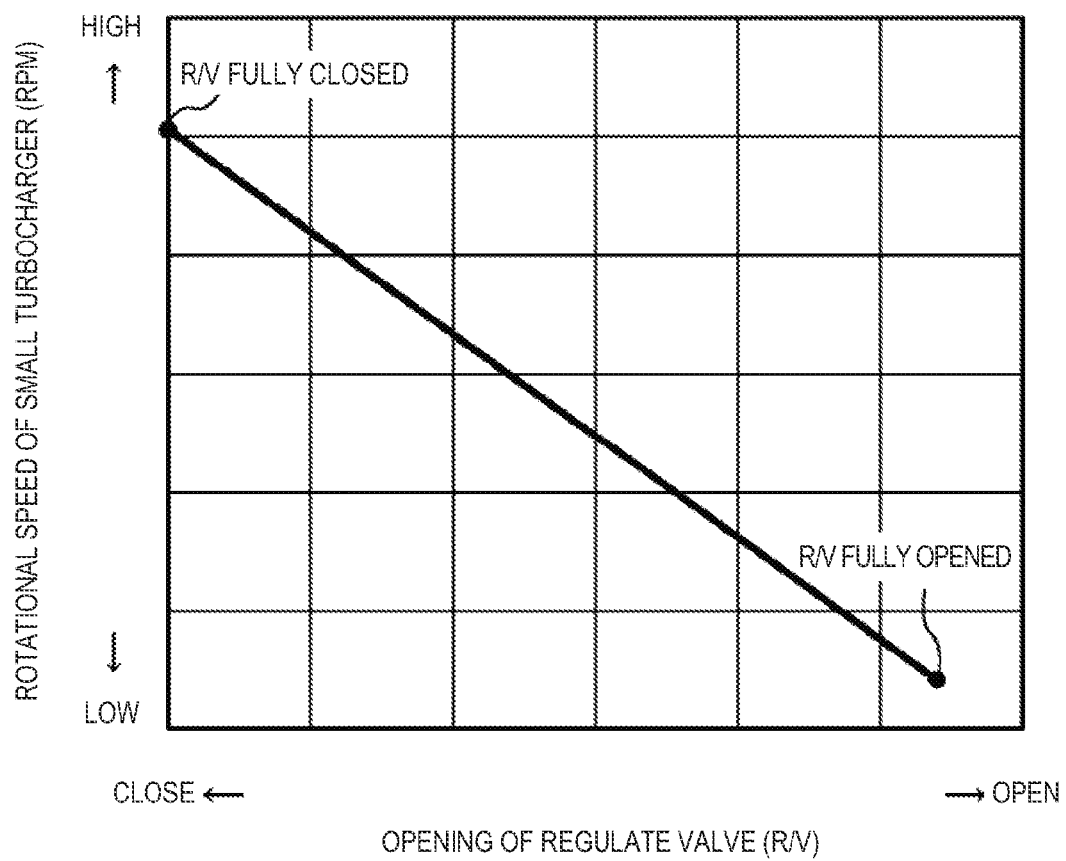
FIG. 4 is a chart schematically illustrating a relation between an opening area of a regulator valve and a turbine rotational speed of a small turbocharger.

Moreover, the PCM 10 controls the regulator valve 64*a* and the waste gate valve 65*a* to predetermined openings set according to the operation state of the engine 1 (engine speed and engine torque), respectively. Specifically, the predetermined openings are stored in the ROM in the form of a map in association with a relation between the engine speed and the engine torque (engine load) so that each of the turbochargers 61 and 62 operate according to the map in FIG. 3. Thus, within a range A of the map on a relatively low engine speed and load side, the PCM 10 controls the regulator valve 64*a* to have a smaller opening and the waste gate valve 65*a* to be fully opened so as to mainly operate the small turbocharger 62. On the other hand, within a range B of the map on a relatively high engine speed and load side, the small turbocharger 62 acts as an exhaust gas resistor and, thus, the PCM 10 controls to open the regulator valve 64*a* larger and the waste gate valve 65*a* to the fully closed state so as to mainly operate the large turbocharger 61. As illustrated in FIG. 4, as the regulator valve 64*a* comes close to the fully closed state, the rotational speed of the turbine 62*b* of the small turbocharger 62 increases and its turbocharging performance improves.

In the regeneration-in-deceleration control, the PCM 10 performs a valve opening correcting control of controlling the opening of the regulator valve 64*a* to be larger than the predetermined opening. In this embodiment, as an example of the valve opening control, in the regeneration-in-deceleration control by the PCM 10, the regulator valve 64*a* is controlled to be the fully opened state (opened larger than the predetermined opening). Therefore, in the regeneration-in-deceleration control, even if the operation range of the engine 1 is within the range A on the relatively low engine speed and load side, because the exhaust gas bypasses the small turbine 62*b*, the small turbocharger 62 does not operate.

As above, in the regeneration-in-deceleration control, the PCM 10 controls the openings of the waste gate valve 65*a* and the regulator valve 64*a* to the predetermined openings, respectively, and on the other hand, in the regeneration-in-deceleration control, the PCM 10 controls the opening of the waste gate valve 65*a* to its predetermined opening and the opening of the regulator valve 64*a* to be larger than its predetermined opening (in this embodiment, the fully opened state).

Further, the PCM 10 controls the opening of the throttle valve 36 according to the operation state of the engine 1. Specifically, the PCM 10 controls to the throttle valve 36 to be fully opened while the regeneration-in-deceleration control is not performed, and on the other hand, the PCM 10 performs a throttle control to control the opening of the throttle valve 36 to be smaller while the regeneration-in-deceleration control is performed. The throttled opening of the throttle valve 36 is set to be close to fully closed within the range where the engine 1 does not stop, and the throttled opening is stored in the ROM in the form of a map in association with a relation between the engine torque and the engine speed.

Further, the PCM 10 controls the opening of the EGR valve 51*a* according to the operation state of the engine 1. Specifically, the PCM 10 calculates a target EGR ratio, and controls the opening of the EGR valve 51*a* to obtain the target EGR ratio. Note that, while the post injection is performed, the PCM 10 controls the EGR valve 51*a* to the fully closed state regardless of the operation state of the engine 1.

Figure 5:
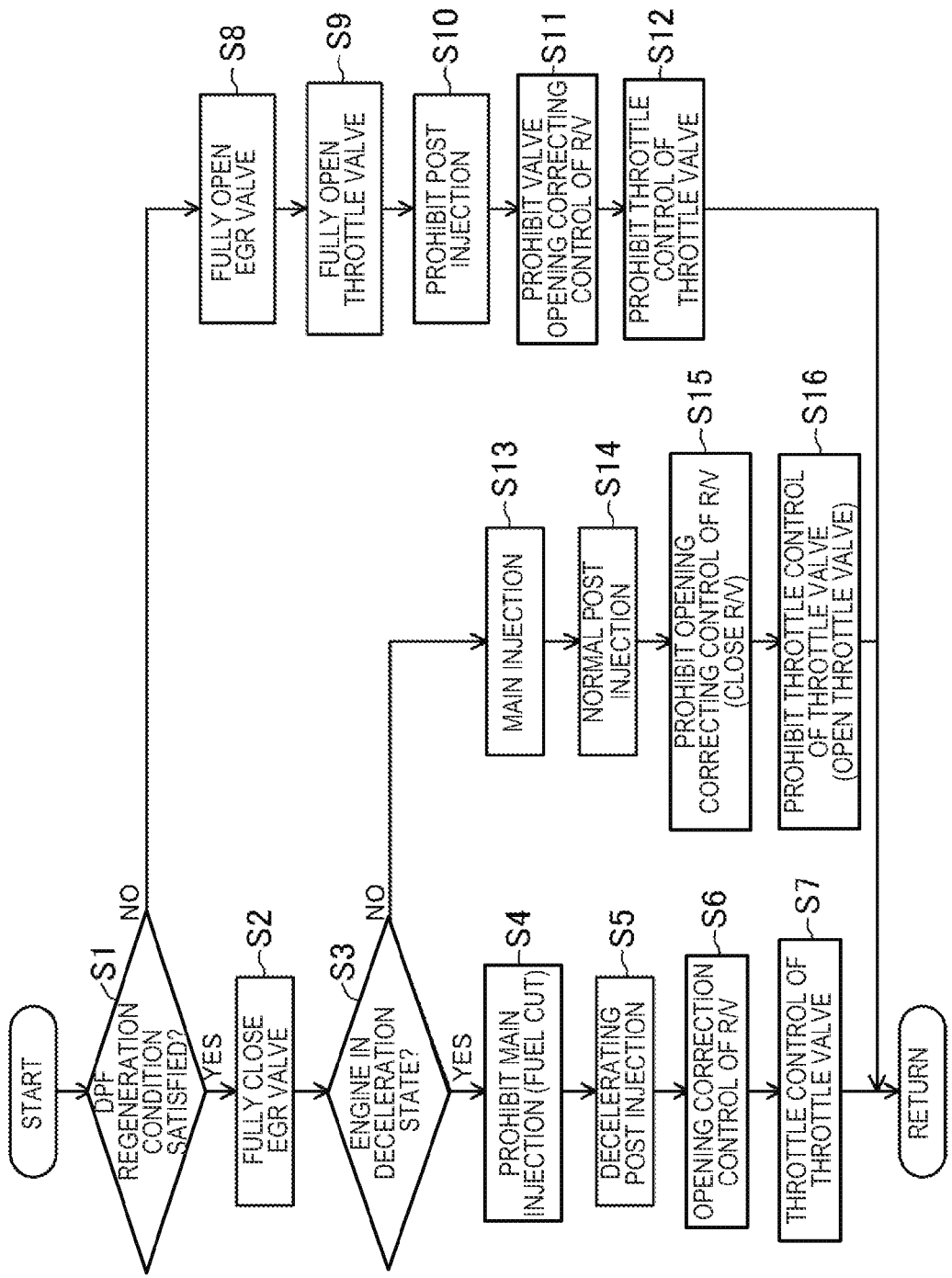
FIG. 5 is a flowchart illustrating a regeneration-in-deceleration control by a PCM.

Next, a DPF regeneration control by the PCM 10 is described in detail based on the flowchart in FIG. 5.

At Step S1, it is determined whether the DPF regeneration condition is satisfied, and when the result is NO, it proceeds to Step S8, and when the result is YES, it proceeds to Step S2.

At Step S2, a control signal is outputted to the operation actuator of the EGR valve 51*a* to fully close the EGR passage 51 (to prohibit an external EGR).

At Step S3, it is determined whether the engine 1 is in the deceleration state based on the signals from the crank angle sensor SW4 (engine speed sensor) and the accelerator opening sensor SW5, and when the result is NO, it proceeds to Step S13, and when the result is YES, it proceeds to Step S4.

At Step S4, the control signal is outputted to the injector 18 to stop the main injection so that the fuel cutting control is performed.

At Step S5, the control signal is outputted to the injector 18 to perform the decelerating post injection.

At Step S6, the control signal is outputted to the operation actuator of the regulator valve 64*a* to perform the valve opening correcting control of the regulator valve 64*a*.

At Step S7, the control signal is outputted to the operation actuator of the throttle valve 36 to perform the throttle control of the throttle valve 36.

At Step S8 consecutive to Step S1 when the determination at Step S1 is NO, the control signal is outputted to the operation actuator of the EGR valve 51*a* to control it to the fully opened state.

At Step S9, the control signal is outputted to the operation actuator of the throttle valve 36 to control it to the fully opened state.

At Step S10, the post injection by the injector 18 is prohibited.

At Step S11, the valve opening correcting control of the regulator valve 64*a* is prohibited.

At Step S12, the throttle control of the throttle valve 36 is prohibited, and then it returns to Step S1.

At Step S13 consecutive to Step S3 when the determination at Step S3 is NO, the control signal is outputted to the injector 18 to perform the main injection of the fuel near the compression TDC of the cylinder 11a.

At Step S14, the control signal is outputted to the injector 18 to perform the normal post injection.

At Step S15, the valve opening correcting control of the regulator valve 64a is prohibited.

At Step S16, the throttle control of the throttle valve 36 is prohibited, and then it returns to Step S1.

With the control device of the diesel engine 1 configured as above, for example, when the DPF regeneration condition is satisfied (Step S1: YES) and the engine 1 is in the deceleration state (Step S3: YES), the decelerating post injection is performed, and the regeneration of the DPF 41b is performed (Step S5). In the deceleration state, because the engine 1 normally shifts toward the range A (see FIG. 3), the waste gate valve 65a is operated to open larger corresponding to the turbocharger operation map in FIG. 3. On the other hand, based on the turbocharger operation map, the regulator valve 64a is controlled to have a smaller opening when the operation state of the engine 1 shifts to the range A; however, in the deceleration state while the DPF is regenerated, the valve opening correcting control of the regulator valve 64a is performed and, thereby, the opening thereof is controlled to open larger than its predetermined opening (in this embodiment, the fully opened state) (Step S6).

As a result, the exhaust gas discharged from the cylinder 11a bypasses the small and large turbines 62b and 61b to be supplied to the oxidation catalyst 41a. In this manner, the heat of the exhaust gas to be supplied to the oxidation catalyst 41a can be prevented from being taken away by the turbines 61b and 62b. Therefore, by the fuel cut performed (stopping the main injection) when the engine 1 shifts to the deceleration state, even if the temperature of the cylinder 11a degrades, the temperature of the exhaust gas to be supplied to the oxidation catalyst 41a is kept high, and the oxidation catalyst 41a can be kept in the activated state as long as possible.

Moreover, when the engine 1 is in the deceleration state while regenerating the DPF, because the EGR valve 51a is controlled by PCM 10 to be fully closed (Step S2), a part of the post injected uncombusted fuel (HC component) can be prevented from being recirculated back from the EGR passage 51 to the cylinder 11a and incompletely combusted. Therefore, the degradation of the engine brake performance when the engine is in the deceleration state does not occur.

Moreover, when the engine 1 is in the deceleration state while regenerating the DPF, the throttle control of the throttle valve 36 is performed, and the opening of the throttle valve 36 is controlled to be smaller (Step S7). Therefore, fresh air (air at low temperature) into the cylinder 11a is suppressed from flowing therein, and the decrease in in-cylinder temperature due to the fuel cut can be suppressed. In this manner, the decrease in temperature of the exhaust gas to be supplied to the oxidation catalyst 41a can further surely be suppressed, and the oxidation catalyst 41a can be maintained in the activated state. As a result, the temperature of the exhaust gas to be supplied to the DPF 41b is kept high and a period of time of regenerating the DPF can be shortened. In this manner, the fuel consumption of the engine 1 is improved and the dilution of the engine oil can be suppressed.

When the DPF starts to be regenerated and the PM accumulation amount M of the DPF 41b falls below the minimum value Y, the DPF regeneration ends. Moreover, if the DPF regeneration ends while the engine 1 is in the deceleration state (Step S1: NO), the valve opening correcting control of the regulator valve 64a and the throttle control of the throttle valve 36 are prohibited by the PCM 10 (Steps S11 and S12), and as a result, the opening of the regulator valve 64a is controlled to open larger, and the throttle valve 36 is controlled to be fully opened. In this manner, when the engine 1 accelerates from the deceleration state, while an intake air amount required in the acceleration is sufficiently secured, the small turbocharger 62 excellent in starting performance is promptly operated to stimulate the increase of a turbocharging pressure, and improve the acceleration response.

As described above, in this embodiment, when the engine 1 is in the deceleration state and the predetermined DPF regeneration condition is satisfied (Step S3: YES), the PCM 10 controls the opening of the regulator valve 64a to open larger (than the predetermined opening) compared to when the DPF regeneration condition is not satisfied (Step S6). In this manner, the DPF regeneration time period when the engine 1 is in the deceleration state is shortened, and as a result, the dilution of the engine oil and the degradation of the fuel consumption due to the post injection (DPF regeneration) can be suppressed.

Other Embodiments

The configuration of the present invention is not limited to the above embodiment, and includes other various kinds of configurations.

Thus, in the above embodiment, when the engine 1 is in the deceleration state during the DPF regeneration, valve opening correcting control of the regulator valve 64a is performed so that the opening of the regulator valve 64a is controlled to open larger compared to when the DPF regeneration condition is not satisfied; however, by additionally performing a valve opening correcting control of the waste gate valve 65a, the opening of the waste gate valve 65a can also be controlled to the open larger compared to when the DPF regeneration condition is not satisfied. In this manner, the temperature decrease due to the exhaust gas passing the turbine can further be suppressed, and the DPF regeneration time period when the engine 1 is in the deceleration state can further be shortened.

Moreover, in the above embodiment, within the low engine speed and load range of the engine 1, the waste gate valve 65a is controlled to the fully opened state; however, it may be controlled to the fully closed state.

In the above embodiment, the two turbochargers 61 and 62 are provided; however, not limiting to this, it may be one or it may be three or more.

The present invention is useful in diesel engines with one or more turbochargers and is particularly useful in diesel engines with two small and large turbochargers.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Diesel Engine
10 PCM (Valve Control Module, DPF Regenerating Module, Fuel Cutting Module)
30 Intake Passage
36 Throttle Valve

40 Exhaust Passage
41*a* Oxidation Catalyst
41*b* DPF
51 EGR passage
51*a* EGR valve
61 Large Turbocharger
62 Small Turbocharger
61*a* Large Compressor
62*a* Small Compressor
61*b* Large Turbine (Downstream Turbine)
62*b* Small Turbine (Upstream Turbine)
64 Small Exhaust Bypass Passage (Upstream Bypass Passage)
65 Large Exhaust Bypass Passage (Downstream Bypass Passage)
64*a* Regulator valve (Upstream Bypass Valve)

The invention claimed is:

1. A control device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, and a DPF arranged within the exhaust passage downstream of the oxidation catalyst and for capturing soot contained within the exhaust gas, the device comprising:
   a fuel cutting module executed on a microprocessor for stopping, when the diesel engine is in a deceleration state, a main injection of the fuel that is performed on compression stroke of the cylinder;
   a DPF regenerating module executed on the microprocessor for performing, when a predetermined DPF regeneration condition is satisfied, a post injection on expansion stroke of the cylinder to supply HC to the oxidation catalyst and regenerate the DPF by heat generated from an oxidation reaction of HC; and
   a bypass valve control module executed on the microprocessor for controlling the bypass valve,
   wherein when the diesel engine is in the deceleration state and the predetermined DPF regeneration condition is not satisfied, the bypass valve control module controls the opening of the bypass valve to its predetermined opening to an extent less than an opening of the bypass valve when the diesel engine is in the deceleration state and the predetermined DPF regeneration condition is satisfied;
   wherein when the diesel engine is in the deceleration state and the predetermined DPF regeneration condition is satisfied, the bypass valve control module controls the bypass valve to open to an extent more than an opening of the bypass valve when the diesel engine is in the deceleration state and the predetermined DPF regeneration condition is not satisfied.

2. The device of claim 1, further comprising:
   an EGR passage communicating an intake passage for introducing intake air into the cylinder with a part of the exhaust passage upstream of the turbine;
   an EGR valve for opening and closing the EGR passage; and
   an EGR valve control module executed on the microprocessor for controlling the EGR valve,
   wherein while the DPF is regenerated by the DPF regenerating module, the EGR valve control module controls the EGR valve to be fully closed.

3. A control device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, and a DPF arranged within the exhaust passage downstream of the oxidation catalyst and for capturing soot contained within the exhaust gas, the device comprising:
   a fuel cutting module for stopping, when the diesel engine is in a deceleration state, a main injection of the fuel that is performed on compression stroke of the cylinder;
   a DPF regenerating module for performing, when a predetermined DPF regeneration condition is satisfied, a post injection on expansion stroke of the cylinder to supply HC to the oxidation catalyst and regenerate the DPF by heat generated from an oxidation reaction of HC; and
   a bypass valve control module for controlling the bypass valve,
   wherein when the diesel engine is in the deceleration state and the predetermined DPF regeneration condition is satisfied, the bypass valve control module controls the bypass valve to open to the extent more than an opening of the bypass valve when the predetermined DPF regeneration condition is not satisfied,
   wherein the turbocharger is a two-stage turbocharger of which the turbines are arranged in line within the exhaust passage from its upstream to downstream,
   wherein the bypass passage includes:
      an upstream bypass passage for bypassing one of the turbines positioned upstream of the other turbine, the turbines being provided within the exhaust passage; and
      a downstream bypass passage for bypassing the downstream turbine,
   wherein the bypass valve includes:
      an upstream bypass valve for opening and closing the upstream bypass passage; and
      a downstream bypass valve for opening and closing the downstream bypass passage,
   wherein the oxidation catalyst is arranged within the exhaust passage downstream of the downstream bypass passage, and
   wherein when the diesel engine is in the deceleration state and the DPF regeneration condition is satisfied, the bypass valve control module controls the upstream and downstream bypass valves to open to an extent more than the openings when the DPF regeneration condition is not satisfied, respectively.

4. The device of claim 3, wherein when the engine is in the deceleration state, after the DPF regeneration by the DPF regenerating module ends, the bypass valve control module controls the bypass valve to throttle to an extent smaller than that the opening of the bypass valve during the DPF regeneration.

5. A control device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, and a DPF arranged within the exhaust passage downstream of the oxidation catalyst and for capturing soot contained within the exhaust gas, the device comprising:

a fuel cutting module for stopping, when the diesel engine is in a deceleration state, a main injection of the fuel that is performed on compression stroke of the cylinder;

a DPF regenerating module for performing, when a predetermined DPF regeneration condition is satisfied, a post injection on expansion stroke of the cylinder to supply HC to the oxidation catalyst and regenerate the DPF by heat generated from an oxidation reaction of HC;

a bypass valve control module for controlling the bypass valve, wherein when the diesel engine is in the deceleration state and the predetermined DPF regeneration condition is satisfied, the bypass valve control module controls the bypass valve to open to the extent more than an opening of the bypass valve when the predetermined DPF regeneration condition is not satisfied;

an EGR passage communicating an intake passage for introducing intake air into the cylinder with a part of the exhaust passage upstream of the turbine;

an EGR valve for opening and closing the EGR passage; and an EGR valve control module for controlling the EGR valve, wherein while the DPF is regenerated by the DPF regenerating module, the EGR valve control module controls the EGR valve to be fully closed, wherein the turbocharger includes a two-stage turbocharger of which the turbines are arranged in line within the exhaust passage from its upstream to downstream, wherein the bypass passage includes:

an upstream bypass passage for bypassing one of the turbines positioned upstream of the other turbine, the turbines being provided within the exhaust passage; and a downstream bypass passage for bypassing the downstream turbine, wherein the bypass valve includes:

an upstream bypass valve for opening and closing the upstream bypass passage; and a downstream bypass valve for opening and closing the downstream bypass passage, wherein the oxidation catalyst is arranged within the exhaust passage downstream of the downstream bypass passage, and wherein when the diesel engine is in the deceleration state and the predetermined DPF regeneration condition is satisfied, the bypass valve control module controls the upstream and downstream bypass valves to open to an extent more than the openings when the predetermined DPF regeneration condition is not satisfied, respectively.

6. A control device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, and a DPF arranged within the exhaust passage downstream of the oxidation catalyst and for capturing soot contained within the exhaust gas, the device comprising:

a fuel cutting module for stopping, when the diesel engine is in a deceleration state, a main injection of the fuel that is performed on compression stroke of the cylinder;

a DPF regenerating module for performing, when a predetermined DPF regeneration condition is satisfied, a post injection on expansion stroke of the cylinder to supply HC to the oxidation catalyst and regenerate the DPF by heat generated from an oxidation reaction of HC; and a bypass valve control module for controlling the bypass valve, wherein when the diesel engine is in the deceleration state and the predetermined DPF regeneration condition is satisfied, the bypass valve control module controls the bypass valve to open to the extent more than an opening of the bypass valve when the predetermined DPF regeneration condition is not satisfied, wherein when the engine is in the deceleration state, after the DPF regeneration by the DPF regenerating module ends, the bypass valve control module controls the bypass valve to throttle to an extent smaller than the opening of the bypass valve during the DPF regeneration.

7. A control device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, and a DPF arranged within the exhaust passage downstream of the oxidation catalyst and for capturing soot contained within the exhaust gas, the device comprising:

a fuel cutting module for stopping, when the diesel engine is in a deceleration state, a main injection of the fuel that is performed on compression stroke of the cylinder;

a DPF regenerating module for performing, when a predetermined DPF regeneration condition is satisfied, a post injection on expansion stroke of the cylinder to supply HC to the oxidation catalyst and regenerate the DPF by heat generated from an oxidation reaction of HC;

a bypass valve control module for controlling the bypass valve, wherein when the diesel engine is in the deceleration state and the predetermined DPF regeneration condition is satisfied, the bypass valve control module controls the bypass valve to open to the extent more than an opening of the bypass valve when the predetermined DPF regeneration condition is not satisfied;

an EGR passage communicating an intake passage for introducing intake air into the cylinder with a part of the exhaust passage upstream of the turbine;

an EGR valve for opening and closing the EGR passage; and an EGR valve control module for controlling the EGR valve, wherein while the DPF is regenerated by the DPF regenerating module, the EGR valve control module controls the EGR valve to be fully closed, wherein when the engine is in the deceleration state, after the DPF regeneration by the DPF regenerating module ends, the bypass valve control module controls the bypass valve to throttle to an extent smaller than that the opening of the bypass valve during the DPF regeneration.

8. A method of controlling device of a diesel engine with a turbocharger including an engine body having a cylinder to which fuel containing diesel fuel as its main component is supplied, a fuel injection valve for injecting the fuel into the cylinder, a turbine of the turbocharger provided within an exhaust passage through which exhaust gas is discharged from the cylinder, a bypass passage for bypassing the turbine, a bypass valve for opening and closing the bypass passage, an oxidation catalyst arranged within the exhaust passage downstream of the turbine and the bypass passage, and for purifying HC contained within the exhaust gas, a DPF arranged within the exhaust passage downstream of the oxidation catalyst and for capturing soot contained within the exhaust gas, and a bypass valve control module executed on a microprocessor for controlling the bypass valve, the method comprising:

stopping, when the diesel engine is in a deceleration state, a main injection of the fuel that is performed on compression stroke of the cylinder;

performing, when a predetermined DPF regeneration condition is satisfied, a post injection on expansion stroke of the cylinder to supply HC to the oxidation catalyst and regenerate the DPF by heat generated from an oxidation reaction of HC;

controlling, when the diesel is in the deceleration state and the predetermined DPF regeneration condition is not satisfied, the bypass valve to open to its predetermined opening to an extent less than an opening of the bypass valve when the diesel engine is in the deceleration state and the predetermined DPF regeneration condition is satisfied; and controlling, when the diesel engine is in the deceleration state and the predetermined DPF regeneration condition is satisfied, the bypass valve to open to an extent more than an opening an opening of the bypass valve to when the diesel engine is in the deceleration state and the predetermined DPF regeneration condition is not satisfied.

* * * * *